(12) United States Patent
Garcia et al.

(10) Patent No.: US 6,520,684 B2
(45) Date of Patent: Feb. 18, 2003

(54) BEARING RETENTION SYSTEM

(75) Inventors: Michael M. Garcia, Lockport, IL (US); Mark S. Schuck, Joliet, IL (US)

(73) Assignee: International Engine Intellectual Property Company, L.L.C., Warrenville, IL (US)

(*) Notice: Subject to any disclaimer, the term of this patent is extended or adjusted under 35 U.S.C. 154(b) by 48 days.

(21) Appl. No.: 09/821,390

(22) Filed: Mar. 29, 2001

(65) Prior Publication Data

US 2002/0141675 A1 Oct. 3, 2002

(51) Int. Cl.[7] .............................................. F16C 43/00
(52) U.S. Cl. ........................ 384/537; 384/589; 384/542
(58) Field of Search ................................. 384/537, 449, 384/589, 448, 517, 58, 586, 587, 542; 403/11

(56) References Cited

U.S. PATENT DOCUMENTS

| | | | |
|---|---|---|---|
| 4,119,184 A | 10/1978 | Mower et al. | |
| 4,736,727 A | 4/1988 | Williams | |
| 4,989,412 A | 2/1991 | Johnson | |
| 5,302,030 A * | 4/1994 | Buie et al. | ................... 384/449 |
| 5,443,372 A | 8/1995 | Kanoll | |
| 5,602,437 A | 2/1997 | Shahamat et al. | |
| 5,642,042 A * | 6/1997 | Goossens et al. | ............ 384/448 |
| 5,733,050 A | 3/1998 | Diepolder et al. | |
| 5,767,595 A | 6/1998 | Rosen | |
| 5,902,065 A * | 5/1999 | Forestiero et al. | ........... 384/448 |
| 6,017,097 A * | 1/2000 | Weir, III | ...................... 384/589 |
| 6,082,959 A | 6/2000 | Van Duyn | |
| 6,100,809 A | 8/2000 | Novoselsky et al. | |
| 6,123,462 A * | 9/2000 | Crowell | ....................... 384/517 |
| 6,135,712 A | 10/2000 | Chevrollier et al. | |
| 6,144,128 A | 11/2000 | Rosen | |
| 6,332,842 B1 * | 12/2001 | Tabuchi et al. | ................ 403/11 |

OTHER PUBLICATIONS

"Business Class Trucks Service Manual, Supplement 17," catalog, Apr. 1997, Freightliner, Inc.

* cited by examiner

Primary Examiner—Christopher P. Schwartz
Assistant Examiner—Melanie Torres
(74) Attorney, Agent, or Firm—Dennis Kelly Sullivan; Jeffrey P. Calfa; Neil T. Powell

(57) ABSTRACT

Bearing arrangements are provided utilizing retention lips, enlarged retaining washers, or clearance lips to retain a bearing located in an engine in the bearing's housing in the event of bearing failure. Also provided are methods of utilizing retention lips, enlarged retaining washers, or clearance lips to retain a bearing race within a bearing housing in the event of bearing failure.

28 Claims, 5 Drawing Sheets

BEARING RETENTION SYSTEM

BACKGROUND

Conventional engine bearings experience problems with premature bearing failure, and problems with the bearings walking out of their housings during bearing failure. There have been past attempts to help alleviate these problems. One such past attempt was to improve the machining of the bore that holds the bearing to obtain cylindricity and concentricity of the bore in an effort to reduce bearing walkout. Another past attempt was to increase the bearing life by increasing the bearing endplay clearance and implementing a higher temperature grease in the bearing. Yet another past attempt was to add a lock nut to retain the bearing.

SUMMARY OF THE INVENTION

It is in general an object of the invention to utilize a retention lip, an enlarged retaining washer, or a clearance lip to retain a bearing, located in a engine, in the bearing's housing in the event of bearing failure.

In one aspect, a bearing for an engine includes a housing having a retention lip, a race within the housing, and a hub at least partially within the race. The race is at least partially retained within the housing by the retention lip.

In another aspect, a bearing for an engine includes a housing, a race within the housing, the race having an inner portion and an outer portion, a hub at least partially within the race, a retaining bolt, and a retaining washer. The race's inner portion is capable of rotating within the race's outer portion, and the retaining bolt runs through the retaining washer at least partially into an end of the hub. Further, the retaining washer has an outer diameter greater than an outer diameter of the race's inner portion.

In an additional aspect, a bearing for an engine includes a housing having a clearance lip, a race within the housing having an inner portion and an outer portion, a hub at least partially within the race, and a retaining washer. The race's inner portion is capable of rotating within the race's outer portion. Further, the retaining washer is located within the clearance lip.

In another aspect, a method of retaining a bearing race within a bearing housing is provided. A housing having a retention lip, and a race are provided. The race is disposed within the housing. The race is abutted against the retention lip.

In yet another aspect, a method of retaining a bearing race within a bearing housing is provided. A housing, a race having an inner portion and an outer portion, the inner portion being able to rotate within the outer portion, a hub, a retaining bolt, and a retaining washer are provided. The retaining washer has an outer diameter greater than an outer diameter of the race's inner portion. An end of the hub is disposed within the race. The retaining bolt is disposed through the retaining washer at least partially into an end of the hub. The race is disposed within the housing.

In an additional aspect, a method of retaining a bearing race within a bearing housing is provided. A housing having a clearance lip, a race having an inner portion and an outer portion, the inner portion being able to rotate within the outer portion, a hub, and a retaining washer are provided. At least an end of the hub is disposed within the race. The retaining washer is disposed within the clearance lip. The retaining washer is secured to an end of the hub.

The present invention, together with further objects and advantages, will be best understood by reference to the following detailed description taken in conjunction with the accompanying drawings.

DETAILED DESCRIPTION OF THE PREFERRED EMBODIMENTS

Figure 1:
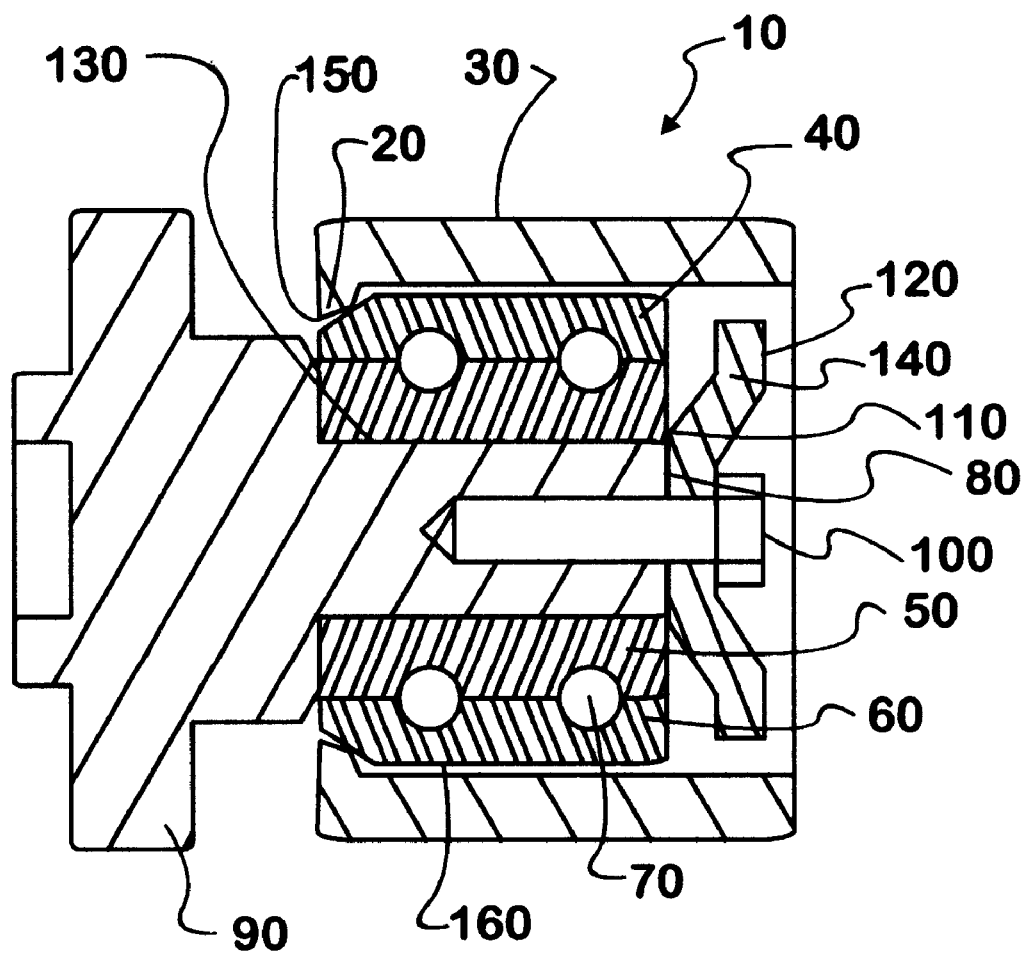
FIG. 1 is a longitudinal cross-sectional view of one embodiment of a bearing for an engine.

FIG. 1 shows a longitudinal cross-sectional view of one embodiment of a bearing 10 for an engine utilizing a retention lip 20 in the bearing's housing 30 to retain a race 40 disposed within the hollow housing 30. The race 40 consists of hollow inner and outer portions, 50 and 60. The race's inner portion 50 rotates within the race's outer portion 60 as a result of fitted rollers 70 dispersed between the inner and outer portions, 50 and 60. Other means may be used for the rollers 70 including, among others, balls and pins. One end 80 of a hub 90 is disposed within the hollow inner portion 50 of the race. A retaining bolt 100 is inserted through a retaining washer 110 into the end of the hub 80. The outer diameter 120 of the retaining washer 110 is greater than the outer diameter 130 of the race's inner portion 50, and in combination with the retaining bolt 100, prevents the end of the hub 80 from slipping out of the race's inner portion 50. As the race's inner portion 50 rotates within the race's outer portion 60, the connected hub 90 also rotates with the inner portion 50 relative to the outer portion 60.

In the event of one type of failure of the bearing, where the race's inner portion 50 starts to walk out of the race's outer portion 60, the outer portion 140 of the retaining washer 110 will abut and grind against the race's outer portion 60, thereby preventing the end of the hub 80 from slipping out of the race's inner portion 50. The grinding noises will alert a user of the bearing's failure.

In the event of another type of failure of the bearing, where the race's outer portion 60 starts to walk out of the bearing's housing 30, because the inner diameter 150 of the retention lip 20 is smaller than the diameter 160 of the race's outer portion 60, the race's outer portion 60 will abut against the retention lip 20 preventing the race's outer portion 60 from walking out of the bearing's housing 30.

Figure 2:
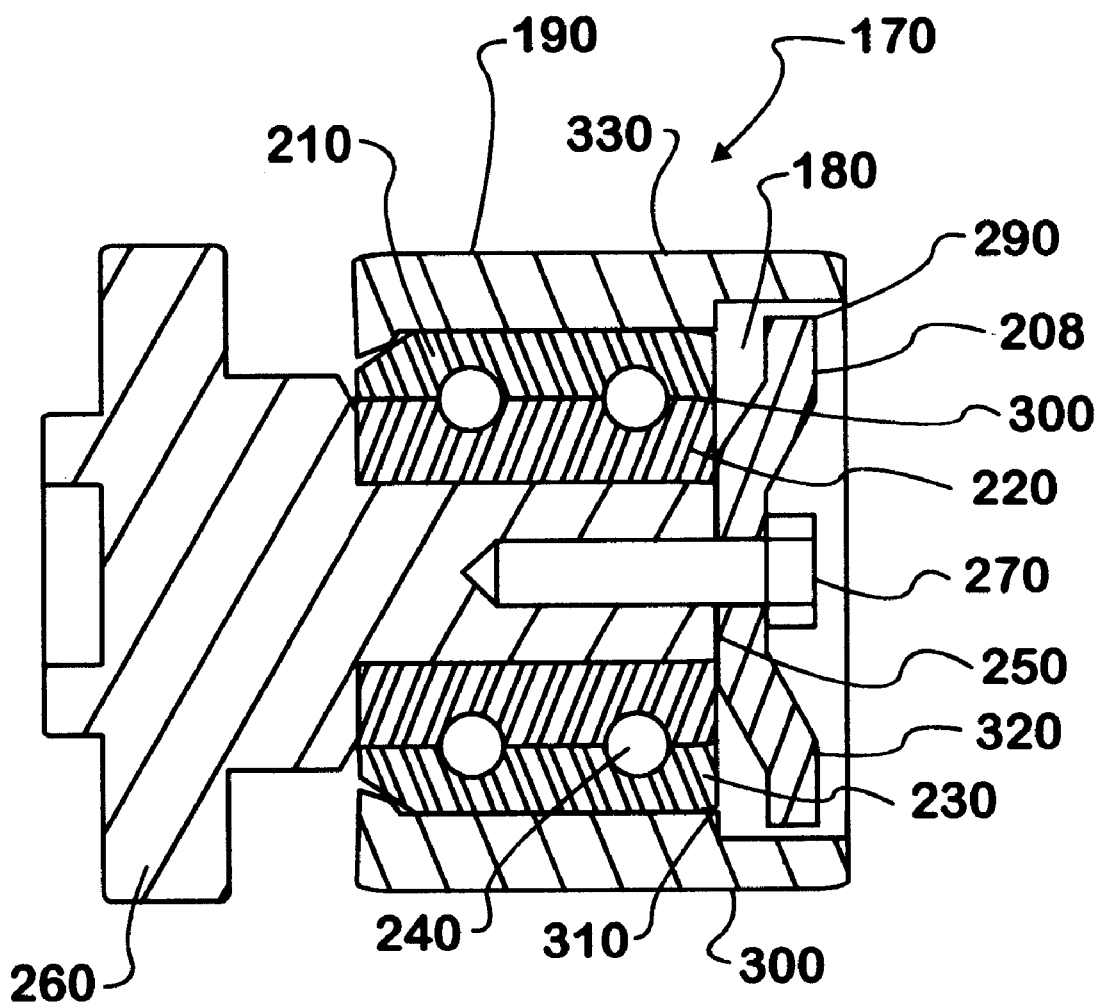
FIG. 2 is a longitudinal cross-sectional view of another embodiment of a bearing.

FIG. 2 shows a longitudinal cross-sectional view of another embodiment of a bearing 170 for an engine utilizing a clearance lip 180 in the bearing's housing 190 to retain an enlarged retaining washer 208. The bearing's race 210 consists of hollow inner and outer portions, 220 and 230. The race's inner portion 220 rotates within the race's outer portion 230 as a result of fitted rollers 240 dispersed between the inner and outer portions, 220 and 230. Other means may be used for the rollers 240 including, among others, balls and pins. One end 250 of a hub 260 is disposed within the hollow inner portion 220 of the race 210. A retaining bolt 270 is inserted through the retaining washer 208 into the end of the hub 250. The outer diameter 290 of the retaining washer 208 is greater than the outer diameter 300 of the race's inner portion 220, and in combination with the retaining bolt 270, prevents the end of the hub 250 from slipping out of the race's inner portion 220. As the race's inner portion 220 rotates within the race's outer portion 230, the connected hub 260 also rotates with the inner portion 220 relative to the outer portion 230.

The outer diameter 290 of the retaining washer 208 is greater than an inner diameter 300 of the bearing's housing 190, but less than an inner diameter 310 of the clearance lip 180. Upon one type of failure of the bearing, in which the race's inner portion 220 starts to walk out of the race's outer portion 230, an outer portion 320 of the retaining washer 208 will abut and grind against a portion 330 of the clearance lip 180, thereby preventing the race's inner portion 220 from slipping out of the race's outer portion 230. The grinding noises will alert a user of the bearing's failure.

Figure 3:
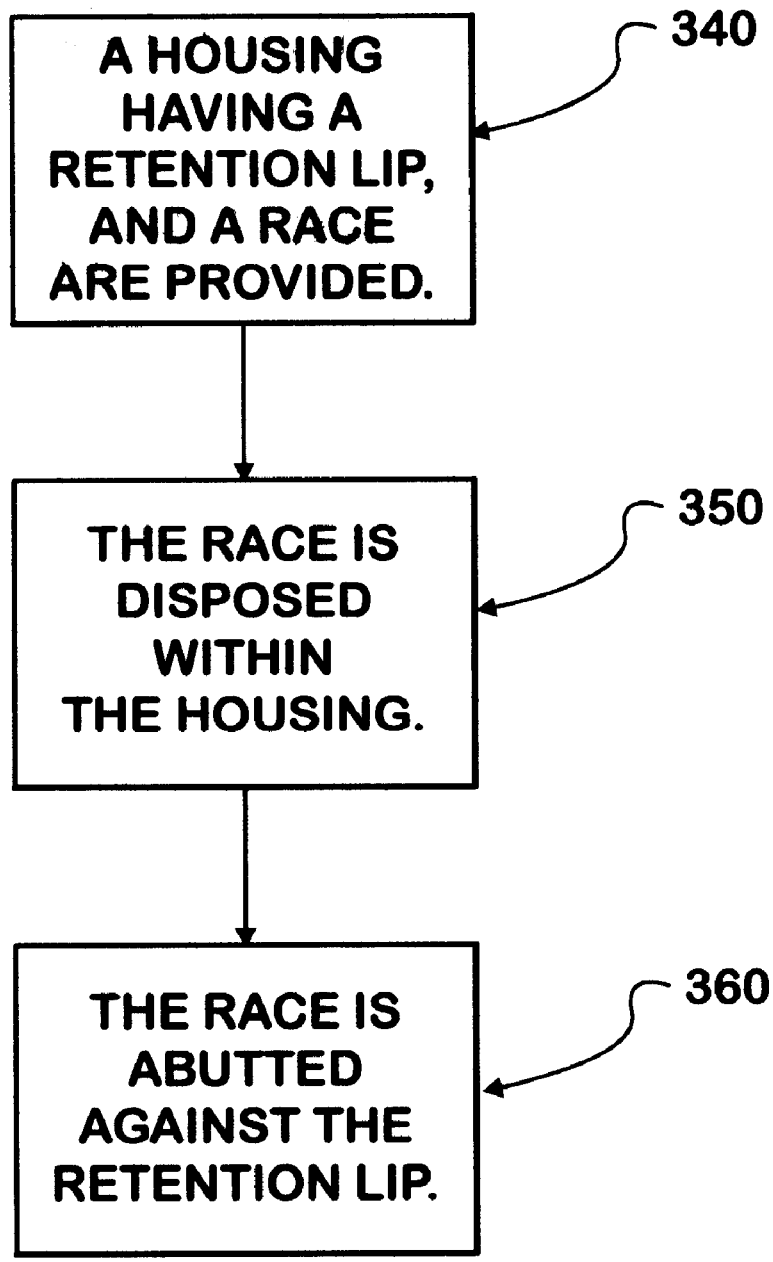
FIG. 3 is a flow chart showing one embodiment of a method for retaining a bearing race within a bearing housing.

FIG. 3 shows a method of retaining a bearing race within a bearing housing. A housing having a retention lip, and a race are provided in act 340. The race is disposed within the housing in act 350. In act 360, the race is abutted against the retention lip. The retention lip may have an inner diameter smaller than the race's outer diameter.

Figure 4:
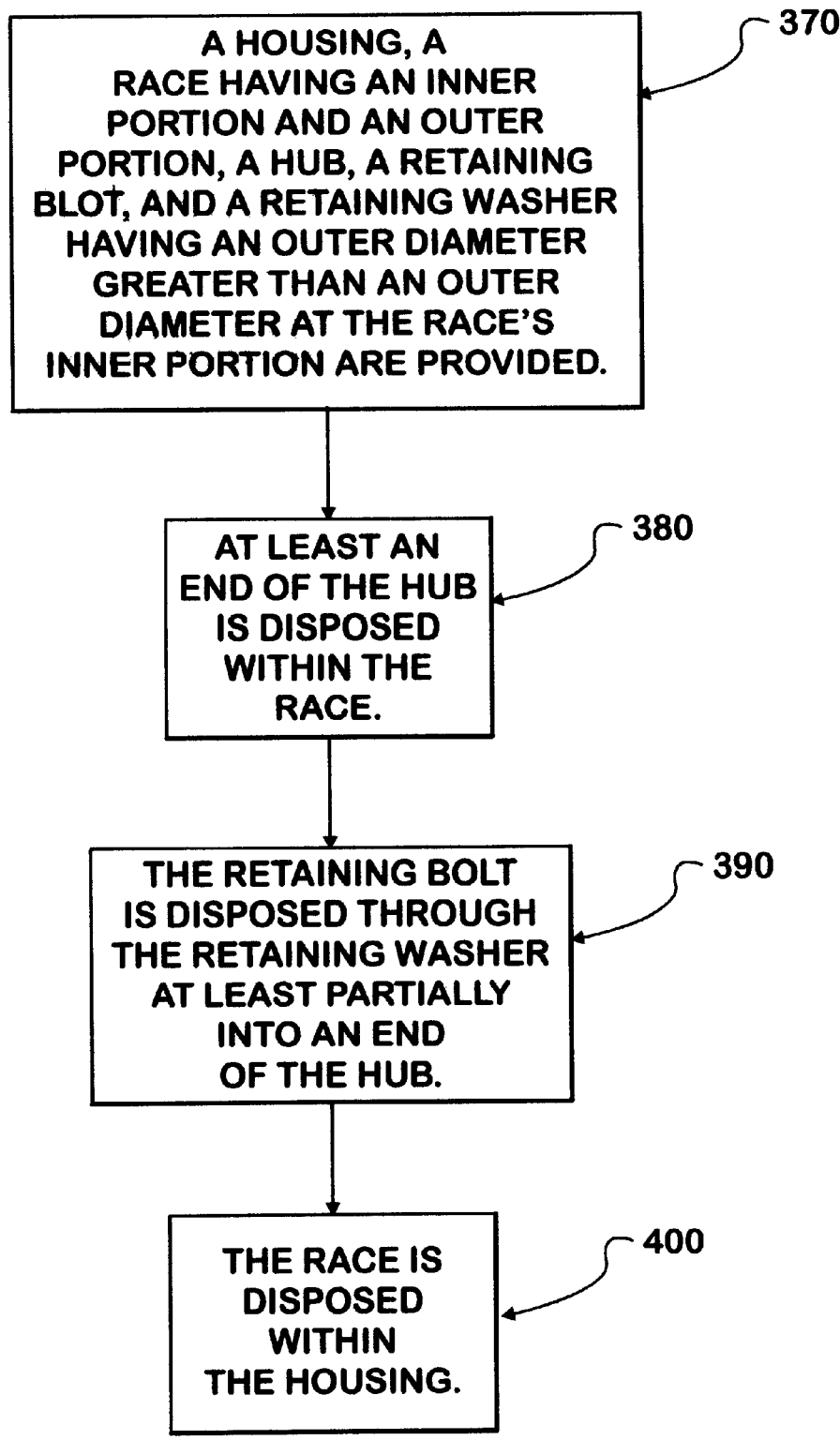
FIG. 4 is a flow chart showing another embodiment of a method for retaining a bearing race within a bearing housing.

FIG. 4 shows another method of retaining a bearing race within a bearing housing. A housing, a race having an inner portion and an outer portion, a hub, a retaining bolt, and a retaining washer are provided in act 370. The race's inner portion is able to rotate within the race's outer portion. The retaining washer has an outer diameter greater than an outer diameter of the race's inner portion. At least an end of the hub is disposed within the race in act 380. The retaining bolt is disposed through the retaining washer at least partially into an end of the hub in act 390. In act 400, the race is disposed within the housing. Upon at least one type of failure of the bearing, at least a portion of the retaining washer may contact the race's outer portion, thereby retaining the race's inner portion within the race's outer portion. The housing may have a clearance lip, the retaining washer being located within the clearance lip. The retaining washer may have an outer diameter greater than an inner diameter of the housing, but less than an inner diameter of the clearance lip. At least a portion of the retaining washer may contact at least a portion of the clearance lip, upon at least one type of failure of the bearing, thereby retaining the race's inner portion within the race's outer portion.

Figure 5:
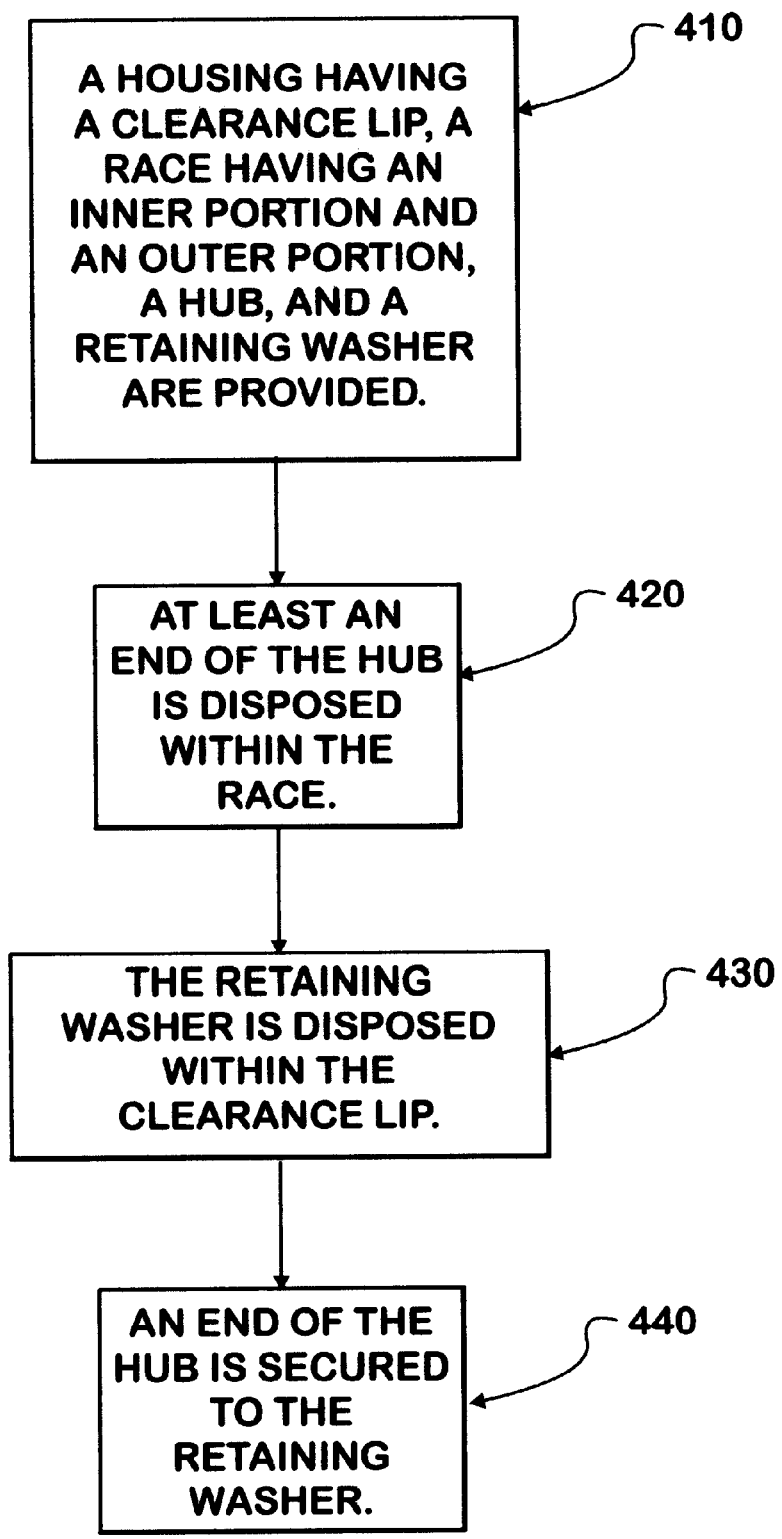
FIG. 5 is a flow chart showing yet another embodiment of a method for retaining a bearing race within a bearing housing.

FIG. 5 shows yet another method of retaining a bearing race within a bearing housing. A housing having a clearance lip, a race having an inner portion and an outer portion, a hub, and a retaining washer are provided in act 410. The race's inner portion is able to rotate with the race's outer portion. At least an end of the hub is disposed within the race in act 420. In act 430, the retaining washer is disposed within the clearance lip. An end of the hub is secured to the retaining washer in act 440. The retaining washer may have an outer diameter greater than an inner diameter of the housing, but less than an inner diameter of the clearance lip. At least a portion of the retaining washer may contact at least a portion of the clearance lip, upon at least one type of failure of the bearing, thereby retaining the race's inner portion within the race's outer portion.

Although the present invention has been described with reference to preferred embodiments, those skilled in the art will recognize that changes may be made in form and detail without departing from the spirit and scope of the invention. As such, it is intended that the foregoing detailed description be regarded as illustrative rather than limiting and that the appended claims, including all equivalents thereof, are intended to define the scope of the invention.

What is claimed is:

1. A bearing for an engine comprising:
   a housing having a retention lip;
   a race within said housing, said race being at least partially retained within said housing by said retention lip, said race having an inner portion and an outer portion, said inner portion being able to rotate within said outer portion;
   a hub at least partially within said race; and
   a retaining bolt and a retaining washer, wherein said retaining bolt runs through said retaining washer at least partially into an end of said hub, said retaining washer disposed for contact with said inner race portion, said retaining washer having an outer diameter greater than an outer diameter of said race's inner portion.

2. The invention of claim 1 wherein said race abuts against said retention lip preventing the race from walking out of said housing.

3. The invention of claim 2 wherein the retention lip has an inner diameter, the race has an outer diameter, and the retention lip's inner diameter is smaller than the race's outer diameter.

4. The invention of claim 1 wherein said race has an inner portion and an outer portion, said inner portion being able to rotate within said outer portion.

5. The invention of claim 4 further comprising a retaining bolt and a retaining washer, wherein said retaining bolt runs through said retaining washer at least partially into an end of said hub, said retaining washer having an outer diameter greater than an outer diameter of said race's inner portion.

6. The invention of claim 5 wherein at least a portion of said retaining washer contacts the race's outer portion, upon at least one type of failure of the bearing, thereby retaining the race's inner portion within the race's outer portion.

7. A bearing for an engine comprising:
   a housing having a retention lip, the housing further comprising a clearance lip;
   a race within said housing, said race being partially retained within said housing by said retention lip; and
   a hub at least partially within said race.

8. The invention of claim 7 further comprising a retaining washer attached to said hub, wherein said retaining washer is located within said clearance lip.

9. The invention of claim 8 wherein said retaining washer has an outer diameter greater than an inner diameter of said housing, but less than an inner diameter of said clearance lip.

10. The invention of claim 9 wherein at least a portion of said retaining washer contacts at least a portion of said clearance lip, upon at least one type of failure of the bearing.

11. The invention of claim 7 further comprising a retaining bolt and a retaining washer, wherein said retaining bolt runs through said retaining washer at least partially into an end of said hub, wherein said retaining washer is located within said clearance lip.

12. The invention of claim 11 wherein said retaining washer has an outer diameter greater than an inner diameter of said housing, but less than an inner diameter of said clearance lip.

13. The invention of claim 12 wherein at least a portion of said retaining washer contacts at least a portion of said clearance lip, upon at least one type of failure of the bearing, thereby retaining the race's inner portion within the race's outer portion.

14. A bearing for an engine comprising:

a housing;

a race within said housing, said race having an inner portion and an outer portion, the inner portion being able to rotate within said outer portion;

a hub at least partially within said race;

a retaining bolt; and a retaining washer disposed in contact with said inner race portion, said retaining bolt running though said retaining washer at least partially into an end of said hub, said retaining washer having an outer diameter greater than an outer diameter of the race's inner portion.

15. The invention of claim 14 wherein at least a portion of said retaining washer contacts the race's outer portion, upon at least one type of failure of the bearing, thereby retaining the race's inner portion within the race's outer portion.

16. The invention of claim 14 wherein said housing has a clearance lip, said retaining washer located within said clearance lip.

17. The invention of claim 16 wherein said retaining washer has an outer diameter greater than an inner diameter of said housing, but less than an inner diameter of said clearance lip.

18. The invention of claim 17 wherein at least a portion of said retaining washer contacts at least a portion of said clearance lip, upon at least one type of failure of the bearing, thereby retaining the race's inner portion within the race's outer portion.

19. A bearing for an engine comprising:

a housing, said housing having a clearance lip;

a race within said housing, said race having an inner portion and an outer portion, the inner portion being able to rotate within said outer portion;

a hub at least partially within said race; and a retaining washer disposed fix contact with said inner race portion, said retaining washer located within said clearance lip.

20. The invention of claim 19 wherein said retaining washer has an outer diameter greater than an inner diameter of said housing, but less than an inner diameter of said clearance lip.

21. The invention of claim 20 wherein at least a portion of said retaining washer contacts at least a portion of said clearance lip, upon at least one type of failure of the bearing, thereby retaining the race's inner portion within the race's outer portion.

22. A method of retaining a bearing race within a bearing housing comprising:

providing a housing, a race having an inner portion and an outer portion, the inner portion being able to rotate within said outer portion, a hub, a retaining bolt, and a retaining washer, said retaining washer having an outer diameter greater than an outer diameter of the race's inner portion;

disposing at least an end of said hub within said race;

disposing said retaining bolt through said retaining washer at least partially into an end of said hub, at least a portion of said retaining washer contacting the race's outer portion upon at least one type of failure of the bearing, thereby retaining the race's inner portion within the race's outer portion; and disposing said race within said housing.

23. The invention of claim 21 wherein said housing has a clearance lip, said retaining washer located within said clearance lip.

24. The invention of claim 23 wherein said retaining washer has an outer diameter greater than an inner diameter of said housing, but less than an inner diameter of said clearance lip.

25. The invention of claim 24 wherein at least a portion of said retaining washer contacts at least a portion of said clearance lip, upon at least one type of failure of the bearing, thereby retaining the race's inner portion within the race's outer portion.

26. A method of retaining a bearing race within a bearing housing comprising:

providing a housing having a clearance lip, a race having an inner portion and an outer portion, the inner portion being able to rotate within said outer portion, a hub, and a retaining washer;

disposing at least an end of said hub within said race;

disposing said retaining washer in contact with said inner race portion within said clearance lip; and securing said retaining washer to an end of said hub.

27. The invention of claim 26 wherein said retaining washer has an outer diameter greater than an inner diameter of said housing, but less than an inner diameter of said clearance lip.

28. The invention of claim 27 wherein at least a portion of said retaining washer contacts at least a portion of said clearance lip, upon at least one type of failure of the bearing, thereby retaining the race's inner portion within the race's outer portion.

* * * * *